(12) United States Patent
Sprouse et al.

(10) Patent No.: US 7,921,255 B2
(45) Date of Patent: Apr. 5, 2011

(54) DUPLICATE SD INTERFACE MEMORY CARD CONTROLLER

(75) Inventors: Steven Theodore Sprouse, San Jose, CA (US); Ka Ian Yung, Mountain View, CA (US)

(73) Assignee: SanDisk Corporation, Milpitas, CA (US)

( * ) Notice: Subject to any disclaimer, the term of this patent is extended or adjusted under 35 U.S.C. 154(b) by 502 days.

(21) Appl. No.: 11/963,519

(22) Filed: Dec. 21, 2007

(65) Prior Publication Data

US 2009/0164686 A1 Jun. 25, 2009

(51) Int. Cl.
*G06F 12/00* (2006.01)
(52) U.S. Cl. ........................................ 711/103
(58) Field of Classification Search ................. None
See application file for complete search history.

(56) References Cited

U.S. PATENT DOCUMENTS

| | | | |
|---|---|---|---|
| 3,832,643 A * | 8/1974 | Van Heyningen et al. | 330/273 |
| 5,909,360 A * | 6/1999 | Lavin et al. | 307/66 |
| 7,152,801 B2 | 12/2006 | Cuellar et al. | |
| 7,310,692 B2 | 12/2007 | Miller et al. | |
| 7,340,540 B2 | 3/2008 | Miller et al. | |
| 7,355,860 B2 | 4/2008 | Miller et al. | |
| 7,364,090 B2 | 4/2008 | Cuellar et al. | |
| 7,464,193 B2 | 12/2008 | Lasser | |
| 7,487,265 B2 | 2/2009 | Miller et al. | |
| 7,554,813 B2 | 6/2009 | Miller et al. | |
| 7,710,736 B2 | 5/2010 | Middlekauff et al. | |
| 2004/0059846 A1* | 3/2004 | Liu et al. | 710/62 |
| 2005/0182858 A1* | 8/2005 | Lo et al. | 710/1 |
| 2006/0125418 A1* | 6/2006 | Bourgault | 315/291 |
| 2006/0288146 A1* | 12/2006 | Chen | 710/301 |
| 2008/0235410 A1* | 9/2008 | Koh | 710/23 |
| 2009/0085221 A1 | 4/2009 | Sprouse et al. | |

OTHER PUBLICATIONS

Genesys Logic, Inc., "GL828 USB 2.0 SD/MMC Single Slot Card Reader Controller" Revision 1.02, Dec. 28, 2006.

* cited by examiner

*Primary Examiner* — Hiep T Nguyen
(74) *Attorney, Agent, or Firm* — Weaver Austin Villeneuve & Sampson LLP

(57) ABSTRACT

A memory controller for a memory card such as an SD card with an additional host interface such as a USB interface comprises a duplicate SD interface. Embodiments with two SD interfaces may also comprise a card reader controller chip that can be turned off by the memory controller when the USB interface is not needed. Incorporation of the additional SD interface in the controller allows for an economical or off the shelf card reader controller to be employed.

16 Claims, 1 Drawing Sheet

US 7,921,255 B2

DUPLICATE SD INTERFACE MEMORY CARD CONTROLLER

BACKGROUND OF THE INVENTION

The present application relates generally to portable memory storage devices, and more particularly to those that can be used with different types of host receptacles.

In a memory card that incorporates a second interface in addition to the standard memory card contact interface, providing and managing both interfaces is a challenge in light of power consumption and cost constraints. Additionally, as both interfaces need to access the flash memory, contentions between the two interfaces must be efficiently resolved.

SUMMARY OF THE INVENTION

A memory controller for a memory card such as an SD card with an additional host interface such as a USB interface comprises a duplicate SD interface. Embodiments with two SD interfaces may also comprise a card reader controller chip that can be turned off by the memory controller when the USB interface is not needed. Incorporation of the additional SD interface in the controller allows for an economical or off the shelf card reader controller to be employed.

The provision of two discrete electrically isolated SD buses within the card minimizes electrical interference on the buses and allows for clean data transfer at high rates of speed.

DETAILED DESCRIPTION OF THE PREFERRED EMBODIMENTS

Figure 1A:
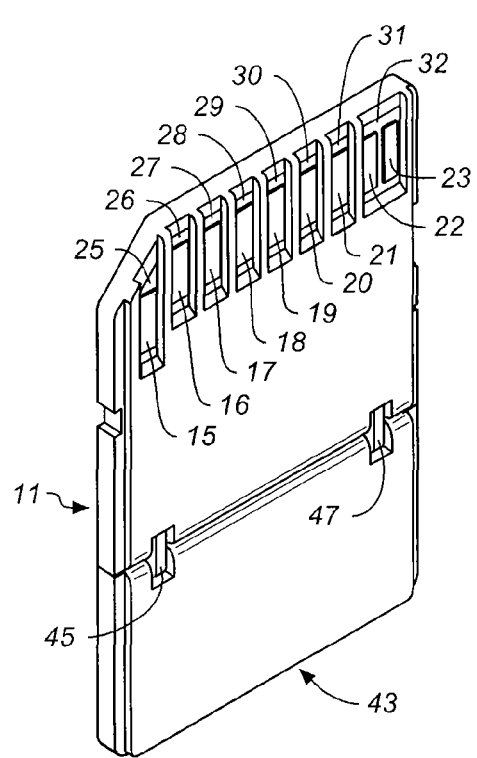
FIGS. 1A and 1B are perspective views of a memory card having two sets of electrical contacts with a cover of one set of contacts closed (FIG. 1A) and with the cover opened (FIG. 1B).
Figure 1B:
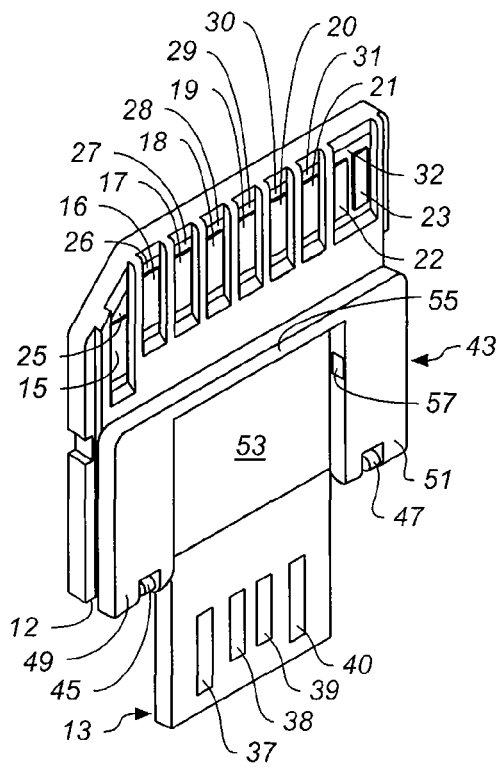

Cost is an ever increasing factor as the sales volume and competition in the memory card market increases.

Versatility of a portable flash memory storage device such as a memory card is also critical to the consumer. The SD Plus card from the SanDisk Corporation has received numerous design awards due to its ease of use. It has the form factor of a Secure Digital ("SD") card so it can be used in standard SD slots of portable host devices such as a digital camera, but also incorporates a Universal Serial Bus ("USB") connector. When the card is folded approximately in half, the USB connector is exposed. Because the cover folds back approximately 180 degrees, the SD Plus card can easily be inserted into very tightly spaced connector areas of hosts such as personal computers and the like.

The example memory card described herein utilizes one set of contacts and a signal protocol from one published memory card standard, such as that for the SD card, and the other set of contacts and a signal protocol according to another published standard, such as the USB standard or another that provide similar opportunities for use, such as the IEEE 1394 standard. Many types of hosts include receptacle slots for SD cards, particularly cell phones, PDAs, MP-3 players, cameras and the like, while USB receptacles are common in personal computers, notebook computers and the like. Such a combination of interfaces thereby allows the memory card system to be used directly with a wider variety of host devices than either one alone.

Referring to the figures, an example memory card will be described. A predominately rectangular main body portion 11, in this case a shortened version of the SD card, has a rectangular extension 13 formed as part of the card to provide an additional interface, in this case a USB compatible plug. Since the extension 13 is narrower than the portion 11, end surfaces (e.g., 12) of the main body portion 11 exist on either side of the extension 13. According to the SD Memory Card Specifications, nine electrical contacts 15-23 are provided on bottom surfaces of eight grooves 25-32 along one end of the card, the two contacts 22 and 23 being placed in the one groove 32. Four electrical contacts 37-40, arranged according to the USB specifications, are provided on the flat surface of the extension 13. Both sets of contacts 15-23 and 37-40 are positioned on the same side of this example memory card but they could alternately be placed on opposite sides.

In order to protect the contacts 37-40 when not being used, a cover 43 is rotatably connected with the card so that it may be closed to cover the contacts 37-40 when they are not being used and opened to expose the contacts 37-40 when the extension 13 is inserted into a matting receptacle. These positions are shown to be one hundred eighty degrees apart. In this specific example, the cover 43 is attached to the card portion 11 at its end surfaces 12 and 14 by respective hinges 45 and 47 that allow for such rotation of the cover 43 by hand. The cover 43 has thick side portions 49 and 51 to which the hinges 45 and 47 are respectively connected. The side portions 49 and 51 fit around the extension 13 when the cover is closed, and a thin layer 53 of material spanning between the side portions 49 and 51 covers the contacts when the cover 43 is closed. The layer 53 has a size that is approximately that of the extension 13 in order to cover it when the cover 43 is closed. An end portion 55 spanning the side portions 49 and 51 is also preferably provided as part of the cover 43. When the cover 43 is closed, its end portion 55 fits over an extreme end of the extension 13.

The memory card thus described, one embodiment of a flash memory drive, is commercially referred to as the SD Plus card. For more information on embodiments of the SD Plus card please refer to U.S. patent application Ser. No. 11/461,731 filed Aug. 1, 2006, which is hereby incorporated by this reference in the entirety. In the initial designs of the SD Plus card, multiple chips or die were used to provide the added coordination and functionality of having the USB interface in the card. Initial unit costs were nearly ten times of a current SD (only) card, thereby resulting in a very high final price to the consumer. Other previous solutions with versatile memory controllers incorporated a front end that had a USB interface incorporated into the memory controller. While such a controller could be universally used, many memory cards did not utilize the interface but still paid the cost for the interface and the associated licenses required, which of course negatively impacts margin and/or price.

The present invention reduces the costs by eliminating the use of external bus switches needed when integrating a card reader controller with an SD controller for SD Plus products. It also reduces cost by eliminating the need to implement a specific controller for SD Plus products.

One design constraint in some embodiments of an SD card is available or budgeted power and/or current. For example, only 250 microamps may be available for all the components. In some embodiments of an SD card including an embodiment of the SD Plus card from SanDisk, a card reader integrated circuit chip ("IC") is used to read an SD bus from the memory controller and provide a different host interface to external devices, for example, a USB interface. Low power/current consumption card reader ICs are significantly more expensive than other such ICs or alternatively must be custom fabricated. More economical card reader IC's may consume far too much current, for example, one milliamp, more than the total current consumption allotted for the complete card.

Figure 1C:
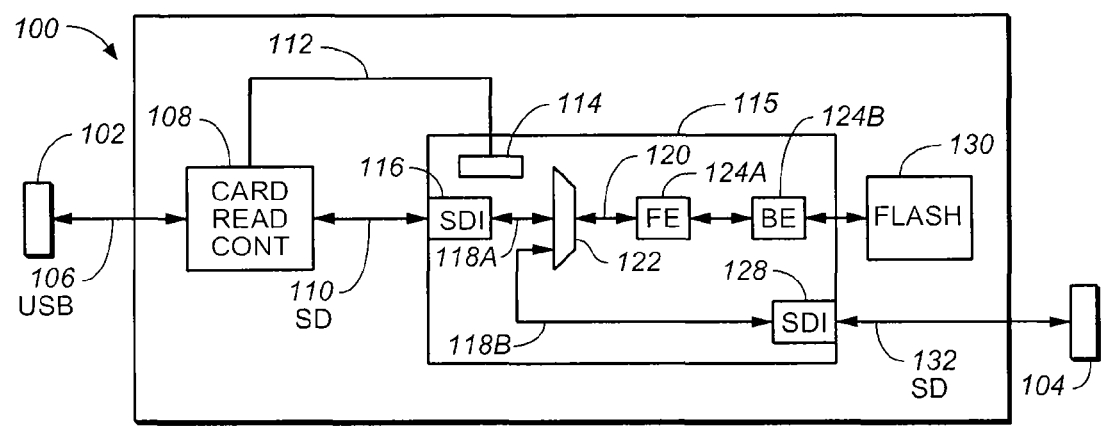
FIG. 1C is a block diagram of flash memory storage device 100.

FIG. 1C illustrates flash memory storage device ("FD") 100. FD 100 acts as a mass storage device and emulates a traditional hard disk. For example, FD 100 communicates with a host device 102 using a host computing protocol such as the USB protocol and associated connectors and interface. Another example of a currently available host interface would be IEEE 1394, more commonly referred to as "Firewire."

FD 100 preferably also has the form factor of a Secure Digital Card in order to be received by and communicate with an SD compliant host 104, although it could for example only have the form factor in the contact region so it may be accommodated and read by an SD card reader/slot. Additionally, FD 100 may have the form factor of and conform with the protocols/standards of any commercially available memory card such as the MMC card, Memory Stick, XD card, mini SD card, micro SD card, Compact Flash card and the like.

Flash memory chip/array 130 is the mass data storage medium of device 100 and may be of a NAND or NOR architecture. It may also incorporate other non volatile storage technology such as magnetic RAM etc. Read write operations of memory 130 are controlled by memory controller integrated circuit 115, which also controls communications with host computing devices such as personal computers, digital cameras, music and video players, mobile telephones, personal digital assistants and various combinations and permutations thereof. Memory controller 115 comprises operating firmware 124. In certain embodiments firmware 124 may be logically divided into front end firmware 124A and back end firmware 124B. This allows for the firmware to more easily accommodate different types of "back end" memories 130 and different types of "front end" hosts 102, 104 and associated host interfaces. In such a way, different compatible front and back end firmware releases may be combined to accommodate different hardware configurations. In one preferred embodiment, controller 115 incorporates two SD interfaces 116 and 128, and FD 100 incorporates two SD buses 110, and 132.

In order to provide a USB (or other non-memory card host computer) interface 106, card reader controller 108 is provided as a part of device 100. Thus FD 100 can be used in memory card slots and plugged into other often more readily available host computer receptacles. Card reader power control circuitry 114 controls the power provided to and/or received from card reader controller 108 via card reader power lines 112. Power control circuitry isolates the card reader controller 108 from the SD buses 110 and 132 and can shut off power entirely to controller 108 when the host interface is not used. This greatly reduces the power consumption of FD 100. Circuitry 114 can control the power via a diode or transistor such as a p MOSFET.

Providing a memory controller with two SD interfaces allows the controller to be integrated with any off-the-shelf card reader IC while eliminating the overhead cost of external bus switches. The internal switching within the controller costs only a fraction of what the external bus switches would cost. In addition, since only SD interface 128 is active when operating in SD mode, it offers the competitive advantage of meeting the lowest possible SD power consumption limits and performance requirements of current and future products. Furthermore, because the SD buses provided by the controller do not have any additional loads or parasitic losses/connections the signal is unimpaired. This is an advantage for current and future designs where reliable high speed data transfer is a primary design consideration. For example, an SD bus currently operates at 50 MHz, while in the future the SD bus will need to operate at 100 MHz.

The embodiment shown in FIG. 1C is also preferred to alternative designs where the card reader controller is relied upon to turn off power, because such a design results in undesirable additional loading on the internal SD bus between the card reader controller and the memory controller, (e.g. bus 110) when operating either in USB mode or SD mode.

What is claimed is:

1. A method of operating a flash memory storage device comprising a flash memory array, flash memory controller having a first SD interface coupled with a first SD bus and a second SD interface coupled with a second SD bus electrically isolated from the first SD bus, and a card reader controller, the method comprising:

the card reader controller communicating with the first SD interface via the first SD bus using an SD protocol and communicating with a host interface using a host protocol that differs from the SD protocol; and the second SD interface communicating with a host device using the SD protocol through the second SD bus, the second SD bus independent of and not coupled to the card reader controller.

2. The method of claim 1, further comprising circuitry within the flash memory controller isolating a power supply to the card reader controller so as to shut off or turn on power for the card reader controller.

3. The method of claim 2 further comprising the circuitry shutting off power to the card reader controller with one or more diodes.

4. The method of claim 2 further comprising the circuitry shutting off power to the card reader controller with a transistor.

5. The method of claim 1, wherein the host protocol is a USB protocol.

6. The method of claim 1, further comprising a multiplexer within the flash memory controller multiplexing an SD interface of a logical front end of the controller.

7. The method of claim 2, wherein the circuitry isolates a power supply to the card reader controller so as to shut off power to the card reader controller when the host interface is not used.

8. The method of claim 7, wherein the circuitry isolates a power supply to the card reader controller so as to shut off power to the entire card reader controller when the host interface is not used.

9. A flash memory storage device comprising:
 a flash memory array;
 a flash memory controller coupled to the flash memory array, the flash memory controller comprising a first SD interface coupled with a first SD bus and a second SD interface coupled with a second SD bus electrically isolated from the first SD bus; and
 a card reader controller for communicating with the first SD interface via the first SD bus using an SD protocol and communicating with a host interface using a host protocol that differs from the SD protocol,
 wherein the second SD interface is configured to communicate with a host device using the SD protocol through the second SD bus,
 wherein the second SD bus is independent of and not coupled to the card reader controller.

10. The device of claim 9, further comprising circuitry within the flash memory controller configured to isolate a power supply to the card reader controller so as to shut off or turn on power for the card reader controller.

11. The device of claim 10 wherein the circuitry comprises one or more diodes configured to shut off a power supply to the card reader controller.

12. The device of claim 10 wherein the circuitry comprises a transistor configured to shut off a power supply to the card reader controller.

13. The device of claim 9, wherein the host protocol is a USB protocol.

14. The device of claim 9, the flash memory controller comprises circuitry configured to multiplex an SD interface of a logical front end of the controller.

15. The device of claim 10, wherein the circuitry isolates a power supply to the card reader controller so as to shut off power to the card reader controller when the host interface is not used.

16. The device of claim 15, wherein the circuitry isolates a power supply to the card reader controller so as to shut off power to the entire card reader controller when the host interface is not used.

* * * * *